Patented June 15, 1948

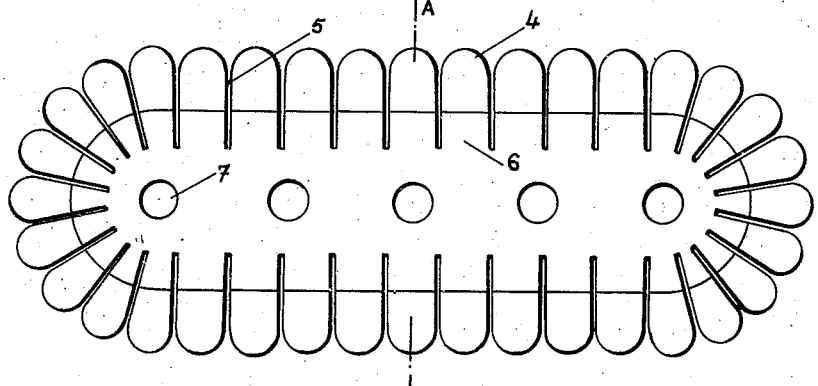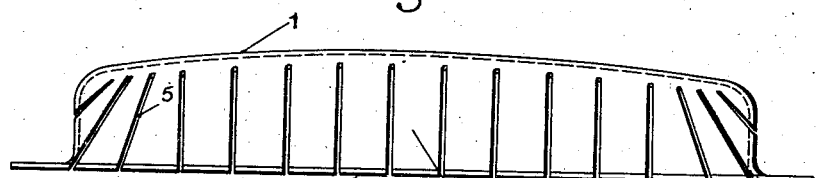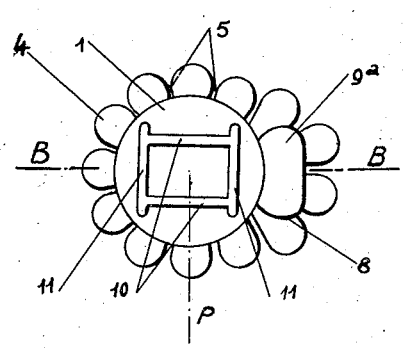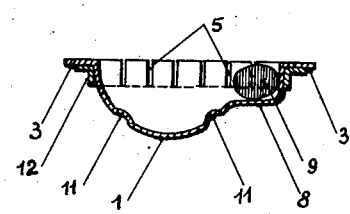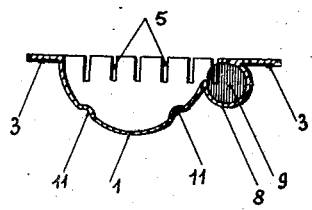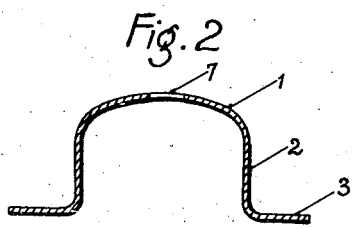

2,443,481

UNITED STATES PATENT OFFICE 2,443,481

DEVICE FOR THE TREATMENT OF WOUNDS AND THE LIKE LESIONS

Léon Paul Séné, Louveciennes, France

Application August 17, 1945, Serial No. 611,162
In France October 19, 1942

12 Claims. (Cl. 128—155)

My invention has for its object a device for treating wounds and the like lesions.

It is known that for treating wounds and the like lesions, it has already been proposed to arrange over each wound or lesion a so-called isolator adapted to cover entirely said wounds or lesions and the object of which is chiefly to allow, as soon as the epidermis has begun its reconstitution, i. e., after the two edges of the wound have been united through the coagulation of the fibrinous clot of blood and the leucocytes and conjunctive cells have formed a first repairing pellicle the removal of the dressing applied directly on the wound; such dressings are dry and sterile for aseptic wounds, or antiseptic and absorbent for septic suppurating wounds and the removal of the dressing allows the process of healing up due to the proliferation of the conjunctive and epithelial cells to be proceeded with freely in contact with the air.

This allows in numerous cases the often rapid removal of the dressings which form, as soon as the effect of their antiseptic constitution is reduced, a medium which is most favorable for the development of pathogeneous germs, while the treatment in an aerated and sound medium of the wound is rendered possible, so that the wound, uncovered and yet protected, is capable of being easily submitted to the action of light and the like rays as well as to antiseptic or healing agents whether fluid or solid, which furthers the process of healing up. Moreover the use of healing up means allows a very frequent examination of the state of the wounds and of their evolution without any fear of tearing the restorative pellicle which adheres to the dressing, when said dressing is taken off.

Generally speaking, the known isolators are constituted by a series of isolated elements formed each by a narrow rigid band appearing as a bridge, i. e., including a superelevated central part and two lateral bases, said elements being generally stayed one with reference to the other and arranged preferably in parallelism and at a certain distance from one another; these elements are of same or different lengths in a manner such that their points of application follow substantially the outline of the wound or lesion under treatment.

Such isolators which are very suitable for the treatment of surgical or accidental wounds and generally for the treatment of a large number of lesions but more particularly in the case of diffuse wounds provided with irregular outlines and which do not suppurate, show however the drawback in the case of suppurating septic wounds to allow the matter carried along or not by the antiseptic agents to flow through the interval existing between the elements forming the isolator and thence on to the sound parts of the skin. Moreover if the application point by point of the different isolated elements forming the isolators, whether stayed or not, shows per se no particular difficulty either for the practitioner or for the patient, experience shows that for the treatment of a large number of lesions it would be of advantage for the practitioner to be able to use isolators in a single part arranged in a manner such as to collect any flowing liquid, said isolators being capable of application without any adhesive on to the wounds to be treated.

My invention has for its object a unitary isolator of the stayed type showing from the standpoints of both flexibility and ease of application, advantages which are far superior to those of the known isolators recalled hereinabove; said improved isolator is more particularly applicable to the treatment of septic or aseptic wounds having regular or irregular outlines, but capable of being inscribed inside a regular geometrical figure (circular, square or the like).

The isolator in accordance with my invention is characterized by the fact that it is constituted by a hollow body of inert and translucid material the superelevated central part of which assumes at its base the shape of a regular geometrical figure which follows substantially the shape of the wound to be treated, said central part being provided with folded over edges adapted to be applied against the sound epidermic tissue adjacent to the wound.

Further advantages and features of my invention will appear when reading the following description of the form of execution of my invention illustrated by way of example in the accompanying drawing.

Fig. 1 is a plan view of an isolator in one part,

Fig. 2 is a cross-sectional view through line A—B of Fig. 1,

Fig. 3 is an outer longitudinal view of this isolator,

Fig. 4 is a plan view of a modification of this isolator adapted more particularly for the treatment of suppurating wounds, Fig. 5 is a cross-sectional view through line B—B of Fig. 4, Fig. 6 illustrates a further modification of the isolator of Fig. 4.

In conformity with my invention, the isolator instead of being constituted by stayed arches or supports which are interconnected through a fascia of plastic or the like material arranged on the vaulted part of the isolator, is provided through the cutting, stamping or the like operation performed on a blank of plastic or the like material, preferably translucid and inert, and showing in its utilization position as in the example illustrated, the appearance of a deformable dome. The dome comprises a rounded bottom 1 and a lateral wall 2 which is substantially vertical so as to make the manipulation of the isolator easier; this isolator is provided at its base with a folded over edge forming a peripheric flange 3 which for further safety ends with rounded parts 4 adapted to be covered with a suitable adhesive adapted to be applied against the sound part of the epidermic tissue surrounding the wound.

This isolator the outline of which is substantially similar to that of the wound which it covers entirely is provided preferably at regular intervals with slots 5 cut in the side wall 2 and the flanges 3, so as to constitute a deformable arrangement showing independent tongues 6 each of which is provided at its lower end with a rounded part 4.

These tongues 6 are easy to displace by reason of their flexibility and may follow readily the outline of the wound to be treated while allowing the deformation required for the isolator.

The isolator which has just been described may also include perforations 7 provided for instance in the vaulted part 1 so as to further in cooperation, if the case may be, with the intervals existing between the tongues, the aeration of the wound and eventually the introduction of gases, vapour or the like agent adapted to produce the disappearance of the pathogeneous germs or the introduction of any agents furthering the process of the epidermic reconstitution.

This isolator which is very suitable for the treatment of wounds which produce no suppuration and which offers a great resistance against crushing, shows however the drawback in its use for infected wounds of allowing the liquid flowing out of said wound to pass out of the isolator through the slots provided between the tongues on to the sound parts of the patient's skin.

This drawback is removed by omitting certain of these slots so as to constitute for instance at the base of the isolator illustrated in Fig. 1 a fluid tight container capable of receiving absorbent material.

Such an arrangement which forms one of the chief points of the invention allows the utilization of the isolator in case of a reduced suppuration of the wound covered by the latter, however for the treatment of wounds which are clearly septic and still show a suppuration which is persistent or liable to appear again, it is preferable to use the two modifications illustrated in Figs. 4, 5 and 6.

In conformity with said figures of the drawings, the isolator is constituted as in the preceding case, and comprises, in the example shown, a cap having a circular base constituted by a flange 3 adapted to rest over the sound epidermic tissue adjacent to the wound; the cap is completed by rounded parts 4 and slots 5 provided in a manner such as to form yielding and adjustable tongues 6.

My invention provides for a lateral swelling 8 (Figs. 4, 5 and 6) on the cap 6, said swelling being arranged as a projection beyond the outline of the wound and being adapted to house at 9, 9a an absorbing substance such as cotton wool for instance.

Such a pad of cotton wool arranged underneath the swelling collects the liquid flowing out of the latter. Of course the flange 3 continues around the swelling 8 so as to form the base of the isolator, said base being in contact with the epidermis.

It will be understood that with such isolators, the matter carried along or not with an antiseptic agent and collected inside the recess 9, 9a and the cotton wool therein can no longer flow on to the sound part of the patient's skin.

In Fig. 6 I have shown a modification of the isolator shown in Figs. 4 and 5 wherein the recess 9a adapted to receive the pad comprises a slightly restricted opening so as to ensure the keeping of the pad inside its recess in spite of the handling of the isolator or of the movements of the patient.

In the description, it has been stated that the isolators are applied against the epidermic tissue through their flanges covered to this end with an adhesive.

In the case of the application of the isolator to the treatment of a wound requiring the frequent removal of the device or in the case of certain particular affections such as varico ulcers, or else when it is impossible to secure by means of an adhesive too sore an epidermis to the flange of the isolator, such an isolator may be held in the desired position by means of securing bands such as yielding or non-yielding ribbons.

In view of using this latter securing means, the isolator should advantageously show at its upper part systems of parallel grooves 10 and/or 11 arranged transversely with reference to one another and adapted to receive and to guide the securing bands.

This arrangement will appear also of particular interest each time the conformation of the part of the body which is to receive the isolator does not allow the use of an adhesive, which is the case for instance of an isolator shaped as an eye bath.

It has also been stated that the isolators comprise slits or intervals adapted to allow the aeration of the wound or the introduction of antiseptic and healing agents: when the entrance of dust or extraneous particles inside the device is to be feared, the latter may be associated with a filtering sleeve 12 applied against its external outline and the peripheral flange in order to close the slots or intervals existing between the elements or tongues.

It is obvious that the invention is in nowise limited to the embodiments which have been more especially described by way of example, but that it extends to all possible modifications coming, fairly, within the scope of the appended claims.

I claim:

1. A device for the treatment of wounds and the like lesions constituted by a hollow body of an inert and translucid material, said hollow body comprising a central superelevated part assuming at its base the shape of a regular geometrical figure, folded over edges jointed to the base of said central superelevated part and slots distributed in such a way on the periphery of said hollow body so as to form a recess adapted to receive a substance capable of absorbing the liquid flowing off the wound and cutting out in said edges a plurality of independent and displaceable tongues.

2. A device for the treatment of wounds and the like lesions constituted by a hollow body of an inert and translucid material, said hollow body comprising a central superelevated part provided with perforations in the central portion of its upper surface and assuming at its base the shape of a regular geometrical figure, folded over edges jointed to the base of said central superelevated part and slots distributed in such a way on the periphery of said hollow body so as to form a recess adapted to receive a substance capable of absorbing the liquid flowing off the wound and cutting out in said edges a plurality of independent and displaceable tongues.

3. A device for the treatment of wounds and the like lesions constituted by a hollow body of an inert and translucid material, said hollow body comprising a central superelevated part assuming at its base the shape of a regular geometrical figure, one lateral swelling on the wall of said central part forming a projection beyond the outline of the wound, an absorbent removable substance in said swelling, folded over edges jointed to the base of said central superelevated part and slots distributed throughout the periphery of said hollow body and cutting out in said edges a plurality of independent and displaceable tongues.

4. A device for the treatment of wounds and the like lesions constituted by a hollow body of an inert and translucid material, said hollow body comprising a central superelevated part provided with perforations in the central portion of its upper surface and assuming at its base the shape of a regular geometrical figure, one lateral swelling with an entrance opening slightly restricted on the wall of said central part forming a projection beyond the outline of the wound, an absorbent removable substance in said swelling, folded over edges jointed to the base of said central superelevated part and slots distributed throughout the periphery of said hollow body and cutting out in said edges a plurality of independent and displaceable tongues.

5. A device for the treatment of wounds and the like lesions according to claim 4 wherein the upper surface of the central superelevated part is also provided with grooves adapted to receive and to guide securing bands.

6. A device for the treatment of wounds and the like lesions according to claim 4 wherein a removable filtering sleeve is fitted around the central superelevated part over the tongues formed in the folded over edges jointed to the base of said central part.

7. A device for the treatment of wounds and like lesions comprising a dome-shaped body; a lateral protuberance on said dome-shaped body connected with the same by a slightly restricted entrance opening in the wall of said dome-shaped body forming a projection beyond the outline of the wound; an absorbent removable substance arranged in said lateral protuberance; and tongue-shaped projections arranged along the base of said dome-shaped body.

8. A device for the treatment of wounds and like lesions comprising a dome-shaped body of an inert and translucent material; a lateral protuberance in a wall of said dome-shaped body forming a projection beyond the outline of the wound; an absorbent substance arranged in said lateral protuberance of said dome-shaped body; and tongue-shaped projections arranged along the base of said dome-shaped body.

9. A device for the treatment of wounds and like lesions comprising an elongated dome-shaped body of an inert and translucent material; an absorbent substance arranged in said dome-shaped body at one end thereof beyond the outline of the wound to be treated; and tongue-shaped projections arranged along the base of said dome-shaped body so as to enable proper placing of the same around the wound.

10. A device for the treatment of wounds and like lesions comprising an elongated dome-shaped body of an inert and translucent material; an absorbent substance arranged in said dome-shaped body at one end thereof beyond the outline of the wound to be treated; means for holding said absorbent substance in proper position; and tongue-shaped projections arranged along the base of said dome-shaped body so as to enable proper placing of the same around the wound.

11. A device for the treatment of wounds and like lesions comprising a dome-shaped body of an inert and translucent material; a lateral protuberance in a wall of said dome-shaped body forming a projection beyond the outline of the wound; an absorbent substance arranged in said lateral protuberance of said dome-shaped body; means for holding said absorbent substance in said lateral protuberance; and tongue-shaped projections arranged along the base of said dome-shaped body.

12. A device for the treatment of wounds and like lesions comprising an elongated dome-shaped body of an inert and translucent material; tongue-shaped projections arranged along the base of said dome-shaped body so as to enable proper placing of the same around the wound; and grooves arranged in the top surface of said dome-shaped body adapted to receive securing bands and to hold the same in proper position.

LÉON PAUL SÉNÉ.

REFERENCES CITED

The following references are of record in the file of this patent:

UNITED STATES PATENTS

| Number | Name | Date |
|---|---|---|
| 2,367,690 | Purdy | Jan. 23, 1945 |

FOREIGN PATENTS

| Number | Country | Date |
|---|---|---|
| 144,928 | Great Britain | June 24, 1920 |